Patented Aug. 11, 1942

2,292,756

UNITED STATES PATENT OFFICE 2,292,756

INSECTICIDE

Herbert L. J. Haller, Washington, D. C., assignor to Henry A. Wallace, as Secretary of Agriculture of the United States of America, and his successors in office No Drawing. Application March 7, 1940, Serial No. 322,683

4 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively nontoxic to man and domestic animals when taken by mouth and which can be used in place of lead arsenate and other arsenicals for destroying insects without leaving a harmful residue on fruits and vegetables.

I have found that organic compounds made by condensing ketones, such as acetone, and semicarbazide to form semicarbazones are effective in killing many species of insects whether applied externally or internally; that these organic products may be sprayed or dusted upon delicate vegetation without injuring it. Suitable products according to this invention are semicarbazones having the formula

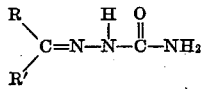

where R and R' are alkyl radicals of the general formula $C_nH_{2n+1}$, such as $CH_3$, $C_2H_5$, $(CH_3)_2CH$, etc.

One of the preferred compounds comprised in this invention is acetone semicarbazone. It is somewhat soluble in water and soluble in organic solvents. The compound may be reduced to impalpable powder by grinding and applied to vegetation either dry as a dust or wet as a spray. The compound being soluble in refined mineral oils, may be applied as a component of an oil emulsion spray.

The value of acetone semicarbazone as an insecticide is shown by the following tests:

1. When southern beet webworm were fed on dusted beet leaves having a deposit of acetone semicarbazone of 300 micrograms per sq. cm. the mortality was 96% after 48 hours.

2. As a concentration of 280 micrograms per sq. cm. acetone semicarbazone killed 100% of fourth instar melon worm fed dusted squash leaves.

3. When tested by the apple-plug technique of Siegler, acetone semicarbazone gave 54.3% of fruit free of worms.

4. Acetone semicarbazone killed 100% of newly hatched screwworm larvae at a concentration of 0.1% when tested by the "jar test" method.

Fumigation tests showed that acetone semicarbazone has no fumigant action; hence the mortalities recorded above are not effected in this manner.

Other compounds of the class comprising this invention are: methyl propyl ketone semicarbazone; ethyl methyl ketone semicarbazone; 4-methyl-2-pentaone semicarbazone; 2-octanone semicarbazone and 2,6-dimethyl-4-heptanone semicarbazone. All of these compounds have been found to be toxic to newly hatched screwworm larvae when tested by the "jar test" method.

It is to be understood that the above-mentioned compounds are used merely as examples and that this invention is not restricted by such use. Also, the above examples are not to be construed as limiting either the method of application of these novel insecticides or the kinds of insects to which they may be applied.

Having thus described my invention, I claim:

1. An insecticide containing as its essential active ingredient a compound of the general formula

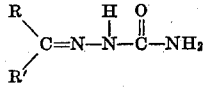

where R and R' are each an alkyl radical of the general formula $C_nH_{2n+1}$.

2. An insecticide containing as its essential active ingredient acetone semicarbazone.

3. An insecticide containing as its essential active ingredient 2,6-dimethyl-4-heptanone semicarbazone.

4. An insecticide containing as its essential active ingredient 2-octanone semicarbazone.

HERBERT L. J. HALLER.